United States Patent [19]
Barbir

[11] Patent Number: 6,122,379
[45] Date of Patent: Sep. 19, 2000

[54] METHOD AND APPARATUS FOR PERFORMING SIMULTANEOUS DATA COMPRESSION AND ENCRYPTION

[75] Inventor: Abbulkader Omar Barbir, Nepean, Canada

[73] Assignee: Deloitte & Touche Inc., Ottawa, Canada

[21] Appl. No.: 08/865,766

[22] Filed: May 30, 1997

Related U.S. Application Data

[60] Provisional application No. 60/031,081, May 30, 1996, and provisional application No. 60/036,109, Jan. 15, 1997.

[51] Int. Cl.[7] .............................. H04N 7/171; H04K 1/00
[52] U.S. Cl. .......................... 380/269; 380/28; 380/217; 706/16; 708/203
[58] Field of Search ................................ 380/28, 37, 49, 380/217, 269; 382/232; 706/16, 20, 22, 203, 204; 712/13

[56] References Cited

U.S. PATENT DOCUMENTS

| | | | |
|---|---|---|---|
| 4,107,458 | 8/1978 | Constant | 178/22 |
| 4,316,055 | 2/1982 | Feistel | 178/22.06 |
| 4,471,164 | 9/1984 | Henry | 178/22.11 |
| 4,760,600 | 7/1988 | Nakai | 380/50 |
| 4,815,130 | 3/1989 | Lee et al. | 380/50 |
| 5,307,412 | 4/1994 | Vobach | 380/42 |
| 5,365,588 | 11/1994 | Bianco et al. | 380/42 |
| 5,454,039 | 9/1995 | Coppersmith et al. | 380/28 |
| 5,479,512 | 12/1995 | Weiss | 380/28 |
| 5,517,614 | 5/1996 | Tajima et al. | 395/180 |
| 5,751,859 | 5/1998 | Howard | 382/238 |

OTHER PUBLICATIONS

P.G. Howard et al., "Arithmetic Coding for Data Compression," Proc. of the IEEE, vol. 82, pp. 857–865, (Jun. 1994).
J. Jiang, "Pipeline Algorithms of RSA Data Encryption and Data Compression," 1996 International Conference on Communication Technology Proceedings, vol. 2, pp 1088–1091, (May 1996).

G.G. Langdon et al., "Encryption Properties of Arithmetic Codes", *IBM Technical Disclosure Bulletin*, No. 11, Apr. 1981, pp. 5118–5119.
Shaw–Min Lei, "Efficient Multiplication–Free Arithmetic Codes", 43 *IEEE Transactions on Communications*, No. 12, Dec. (1995), New York, US, pp. 2950–2959.
Yan–Ping Chen and Yasuhiko Yasuda, "Highly Efficient Entropy Coding of Multi–level Images Using a Modified Arithmetic Code", 1605 *Visual Communications and Image Processing '91: Visual Communication*, (1991) Tokyo, pp. 822–831.
Paul G. Howard and Jeffrey S. Vitter, "Practical Implementations of Arithmetic Coding", published in *Image and Text Compression*, edited by James A. Storer, Kluwer Academic publications, pp. 85–112.
J.L. Mitchell and W.B. Pennebaker, "Software Implementation of the Q–Coder", 32 *IBM Journal of Research & Development*, No. 6, (1998) Nov., Armonk, NY, USA, pp. 753–774.
Witten Ian H. and John G. Cleary, "On the Privacy Afforded by Adaptive Text Compression", *Computers and Security*, 7 (1988) 397–408.
Bergen Helen A. and James M. Hogan, "Data Security in a Fixed–Model Arithmetic Coding Compression Algorithm", *Computers & Security*, 11 (1992) 445–461.
Bergen Helen A. and James M. Hogan, "A chosen plaintext attack on an adaptive arithmetic coding compression algorithm", *Computer & Security*, 12 (1993) 157–167.

*Primary Examiner*—Tod R. Swann
*Assistant Examiner*—Justin T. Darrow
*Attorney, Agent, or Firm*—Miles & Stockbridge P.C.; William L. Feeney

[57] ABSTRACT

A method and apparatus for performing simultaneous data compression and encryption both compresses and encrypts data in a single step. The invention includes a novel modeling method for use in conjunction with a coder, such as an arithmetic coder. The modeling method introduces randomness into the compression process, with the result that the output stream is secure.

32 Claims, 7 Drawing Sheets

METHOD AND APPARATUS FOR PERFORMING SIMULTANEOUS DATA COMPRESSION AND ENCRYPTION

FIELD OF INVENTION

This invention relates to prior provisional application Ser. No. 60/031,081 filed on May 30, 1996 and provisional application Ser. No. 60/036,109 filed on Jan. 15, 1997.

The present invention relates to data compression techniques and to data encryption techniques. More particularly, the invention relates to a method and an apparatus for performing both data compression and data encryption.

BACKGROUND OF THE INVENTION

The term "data" as used herein refers to symbols that can be transmitted or stored. A number of data symbols is referred to as a segment or block. The phrases "application of data to a medium" or "applying data to a medium" refer to the act of putting the data on a communications medium or mediums, or a storage medium or mediums. The application of data to a medium involves the act of generating physical signals (i.e. electrical, electromagnetic, light, or other) which are sent (for a communications medium) or stored (for a storage medium).

Data compression techniques are known in the art for improving the bandwidth of a communications medium and/or the capacity of a data storage medium or system. Such techniques convert data in a first given format into a second format having fewer bits than the original. Lossless data compression techniques include a decompression process that generates an exact replica of the original uncompressed, plaintext or clear data.

Whether stored on a storage medium or transferred over a communications medium between computer systems, data generally contains significant redundancy. Known data compression techniques reduce the redundancy content of the data such that it can be transmitted in less time over communications channels, or such that it will take up less space in a storage medium. Thus, data compression systems are particularly effective if the original data contains substantial redundancy.

Compression systems generally include a modeling method or model followed by a back end coder. To obtain better or higher compression ratio, a multi-step compression system may be used. Multi-step compression systems involve the use of a front end coder, with its associated modeling method, to compress the data prior to implementation of the back end coder, with its associated modeling method.

In a data compression system, the modeler learns the data as it is processed. The modeler will represent the knowledge in its internal variables or states. The coder efficiently represents the knowledge or information generated by the modeler to generate compressed data. The term "coder" as used herein refers either to an encoder, decoder, or both.

Data compression techniques are further described in U.S. patent application Ser. No. 08/609,129.

Whether data is transmitted or stored, it is susceptible to unauthorized observation. Security is becoming particularly difficult as computers are increasingly networked, thus increasing potential access to stored or transmitted confidential data. Known compression algorithms provide a small measure of security, as the compressed data must be deciphered before it can be understood. However, as known compression techniques are based on the reduction to redundancies, data compressed using such techniques is relatively easy to decipher.

To transmit or store data in a secure fashion, the data must first be encrypted. Known encryption techniques usually utilize algorithms that manipulate data as a function of randomly generated bits. Such techniques generally utilize block ciphers, stream ciphers, or other random number generators to introduce randomness into the encryption process.

A stream cipher, for example, outputs a randomly generated bit stream as a function of a seed such as an encryption key. The stream cipher outputs the same stream of bits if the same key is used. Generally, encryption techniques convert plain text to cipher text one bit at a time. The cipher text is obtained from the plain text by performing the mathematical exclusive OR (XOR) operation between the cipher bits and the plain text bits. In the decryption stage, the plain text is retrieved from the cipher text by XORing the bits of the cipher text with the stream cipher bits. The resulting system security is dependent on the design of the stream cipher: the more secure the stream cipher, the more secure the cipher text.

It is known in the art both to compress and to encrypt clear data. Known methods involving both the compression and encryption of data are "sequential", that is, they involve the two discrete steps of compression and then encryption. Note that it is preferred to perform the compression step before the encryption step for at least two reasons. First, by having the data compressed before the encryption step, the security of the encryptor is improved with respect to statistical cryptography attacks, which are based on redundancy. Second, well encrypted data cannot be effectively compressed using known compression techniques.

Prior art methods involving the sequential compression and encryption of data have been referred to as "concryption", or as a "single operation" involving at least one "compression step" and an "encryption step". See, for example, U.S. Pat. No. 5,479,512 (Weiss). Such prior art methods involve a compression step followed by an encryption step, or a compression step followed by an encryption step followed by another compression step. Such methods are therefore sequential compression and encryption methods.

Sequential compression and encryption is an effective method for achieving the goals of, firstly, improving the bandwidth of a communications medium or the capacity of a data storage system, and secondly, ensuring the security of the transmitted or stored data. However, sequential data compression and encryption is slow and computationally expensive because it involves two discrete operations: compression and encryption.

It is known in the art that some measure of security can be achieved simply by compressing data using a method involving an adaptive modeler and a coder without an encryption step. Such a technique was proposed by Witten et al. (see I. H. Witten and J. G. Cleary, "On the Privacy Offered by Adaptive Text Compression", Computers & Security, 7 (1988), pp. 397–408), who suggested that the adaptive nature of the modeler would act like an encryption key that would be difficult for an intruder to duplicate. Witten et al. suggested that for lower security applications, even a fixed or static modeler could be used.

In subsequent publications, however, Bergen et al. have shown that the security of both fixed and adaptive modelers can be highly undermined through a chosen plain text attack. One suggested solution to the low security associated with the compressed data was to XOR the compressed output of the coder with a random number generator. In other words, Bergen et al. suggested sequential data compression and encryption as a solution to the inadequate security achieved through the use of a compression step alone. Regarding fixed modelers, see H. A. Bergen and James M. Hogan, "Data security in a fixed-model arithmetic coding compression algorithm", Computers & Security, 11 (1992), pp. 445–461. Regarding adaptive modelers, see H. A. Bergen and James M. Hogan, "A chosen plaintext attack on an adaptive arithmetic coding compression algorithm", Computers & Security, 12 (1993), pp. 157–167.

SUMMARY OF THE INVENTION

A first object of the present invention is to provide a method and apparatus for compressing and encrypting data.

A second object of the present invention is to provide a method and apparatus for compressing and encrypting data that is fast and therefore computationally inexpensive.

A third object of the present invention is to provide a method and apparatus for compressing and encrypting data that is faster and computationally less expensive than known methods of sequential data compression and encryption.

A fourth object of the present invention is to provide a method and apparatus for compressing and encrypting data that is more secure than known methods of data compression.

The present invention relates to a method and apparatus for performing "simultaneous" (as opposed to sequential) compression and encryption, and simultaneous decompression and decryption, of data. In other words, the data is both compressed and encrypted in a single step. Data that is compressed and encrypted in a single step is processed such that at no time is the input data converted into data that is compressed and not encrypted, and such that at no time is the input data converted into data that is encrypted and not compressed. The invention includes a novel modeling method for use in conjunction with a coder, such as an arithmetic coder. The modeling method introduces randomness into the compression process, with the result that the output stream is secure. The method and apparatus of the present invention are therefore equally aptly described by the terms "simultaneous compression and encryption" and "secure compression".

According to the present invention, there is provided a method for utilizing a processor to change the form of input data having symbols, comprising the steps of: a) providing the input data to the processor; b) processing the input data in the processor by compressing and encrypting the input data in one step to generate compressed and encrypted data; and c) applying the compressed and encrypted data to a medium.

According to the present invention, there is further provided a method for utilizing a processor to change the Form of input data having symbols, comprising the steps of: a) providing the input data to the processor; b) processing the input data in the processor by compressing and introducing randomness into the input data in one step to generate compressed and encrypted data; and c) applying the compressed and encrypted data to a medium.

According to the present invention, there is further provided a method for utilizing a processor to change the form of input data having symbols, comprising the steps of: a) providing the input data to the processor; b) processing the input data in the processor by implementing a learning modeling method having at least one state that is randomly updated; c) processing the input data in the processor by implementing a back end coder to generate compressed and encrypted data by coding the symbols; and d) applying the compressed and encrypted data to a medium.

According to the present invention, there is further provided an apparatus for utilizing a processor to change the form of input data having symbols, comprising: a) means for obtaining the input data at the processor; b) means at the processor for processing the input data, comprising means for compressing and encrypting the input data in one step to generate compressed and encrypted data; and c) means for applying the compressed and encrypted data to a medium.

According to the present invention, there is further provided an apparatus for utilizing a processor to change the form of input data having symbols, comprising: a) means for obtaining the input data at the processor; b) means at the processor for processing the input data, comprising means for compressing and introducing randomness into the input data in one step to generate compressed and encrypted data; and c) means for applying the compressed and encrypted data to a medium.

According to the present invention, there is further provided an apparatus for utilizing a processor to change the form of input data having symbols, comprising: a) means for obtaining the input data at the processor; b) modeler means at the processor for processing the input data, comprising means for implementing a learning modeling method having at least one state that is randomly updated; c) coder means at the processor for processing the input data, comprising means for implementing a back end coder to generate compressed and encrypted data by coding the symbols; and d) means for applying the compressed and encrypted data to a medium.

The following are some of the advantages associated with the present invention. First, the invention provides a data compression and encryption method and apparatus that provides effective data compression and security.

Second, the invention provides a data compression and encryption method and apparatus that is fast and therefore a computationally inexpensive method.

Third, the invention provides a data compression and encryption method and apparatus that is faster and computationally less expensive than known methods of sequential data compression and encryption.

Fourth, the invention provides a data compression and encryption method and apparatus that is more secure than known methods of data compression.

Other features, objects and advantages of the present invention will be readily apparent to those skilled in the art from a review of the following detailed descriptions of the preferred embodiments in conjunction with the accompanying drawings and claims.

DESCRIPTION OF THE DRAWINGS

The embodiments of the invention will now be described with reference to the accompanying drawings, in which.

Similar references are used in different Figures to denote similar components.

DETAILED DESCRIPTION OF THE INVENTION

The following is a description of a preferred embodiment of the present invention. The embodiment employs a simultaneous compression and encryption method and apparatus involving a single step both to compress and encrypt data, or to decompress and decrypt data. The modeling method of the present invention uses an encryption key or a seed with a random number generator such as a stream cipher in conjunction with a modeler and a coder to compress the data in a secure fashion. The method introduces randomness into the compressed data such that the resulting data can only be decoded by a system that uses both the same modeler and the same encryption key as that of the invention.

Figure 1:
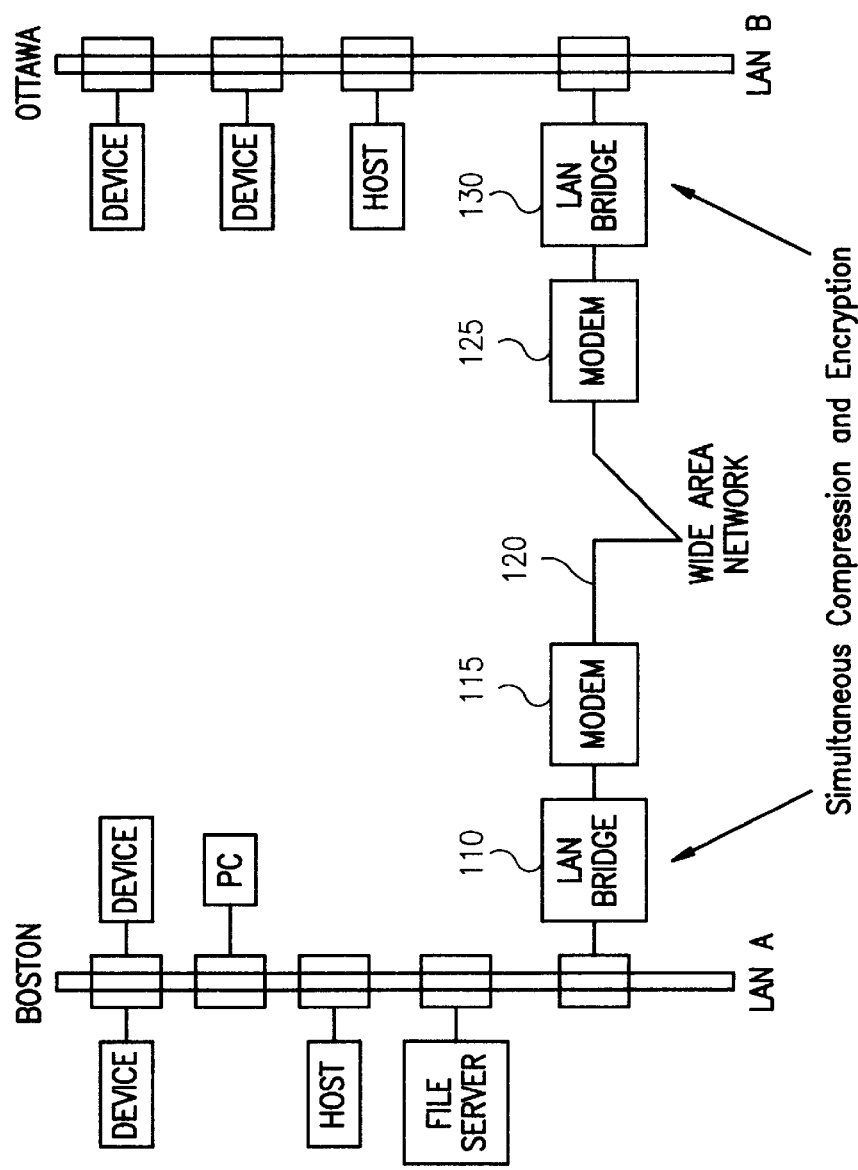
FIG. 1 is a block diagram of a Local Area Network (LAN) to LAN communication network over a wide area network (WAN) link.

Referring to FIG. 1, a pair of Local Area Networks (LAN), namely LAN A and LAN B, are shown. LAN A is located in Boston, and LAN B is located in Ottawa. Each LAN has attached thereto various devices which are well known in the art. Typically, there is little or no need for data compression and encryption within each of LAN A and LAN B. However, when data is transmitted from LAN A to LAN B, it will pass through LAN bridge 110, where the data on LAN A is simultaneously compressed and encrypted in accordance with the invention. The data is then transmitted by modem 115 over Wide Area Network (WAN) link 120 to modem 125. The received data is then decompressed by LAN bridge 130 and the packets appearing at the input to LAN bridge 130 are reconstructed and placed on LAN B.

Figure 2:
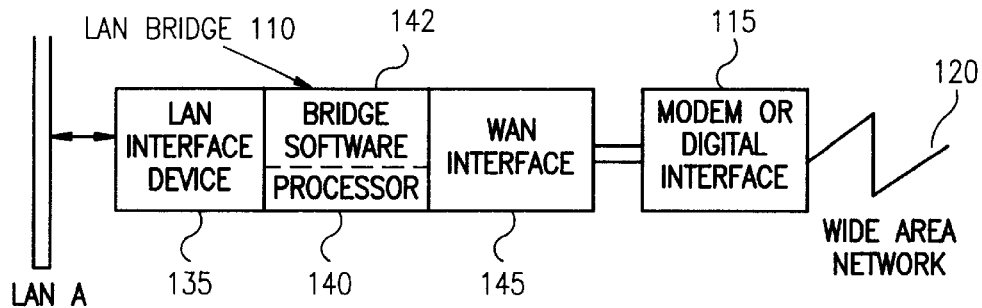
FIG. 2 is a block diagram of the main processor of the embodiment of FIG. 1.

In FIG. 2, a block diagram of LAN bridge 110 is shown. Data appearing on LAN A is received by LAN interface device 135 and passed into processor 140 of LAN bridge 110. Within the processor 140 is bridge software 142 which, in addition to performing routing and other functions, also performs simultaneous data compression and encryption on the data portion of the packets. Data is transmitted to WAN link 120 using WAN interface 145 and modem 115.

Figure 3:
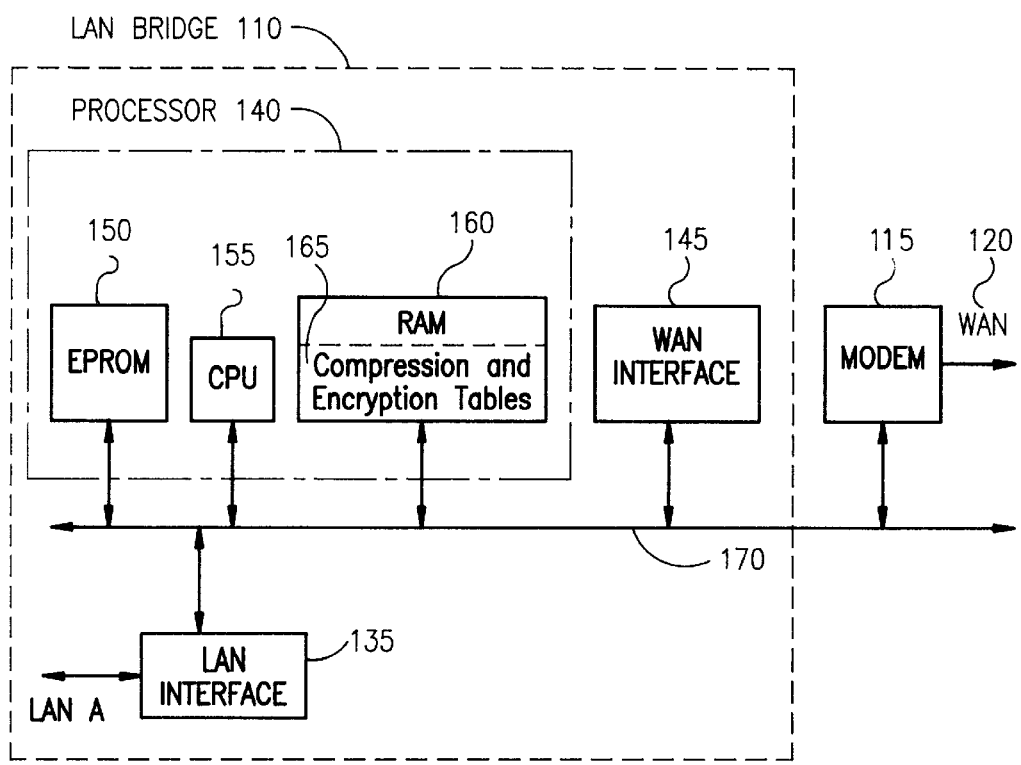
FIG. 3 is a block diagram showing major hardware components of the processor of the embodiment of FIG. 1.

A high level block diagram of LAN bridge 110 is shown in FIG. 3. An electrically alterable programmable read only memory (EPROM) 150 and random access memory (RAM) 160 provide storage functions for CPU 155. The CPU 155 communicates with other elements of the system via bus 170. The LAN interface device 135 is connected to the bus 170, as is WAN interface 145 which provides a gateway for data to and from modem 115. The processor 140 includes EPROM 150, CPU 155 and RAM 160. Alternatively, the CPU may be any special hardware device. Within RAM 160 are compression and encryption tables 165 that are employed by the compression and encryption software within the bridge software 142.

The present invention includes a modeling method operating in conjunction with a coder, such as an arithmetic coder. Before introducing the modeling method of this invention, an overview of arithmetic coding will be provided. For a further explanation, see Witten, I. H. et al., "Arithmetic Coding for Data Compression," Communications of the ACM, Vol. 30, No. 6, pp. 520–540, June 1987.

Arithmetic coding is a technique that represents the source data as a fraction that assumes a value between zero and one. The arithmetic coding algorithm is recursive, that is, the interval is continuously subdivided in proportion to the symbols' probabilistic estimates as generated by a model. For an alphabet of size "m", and for symbol "i", the model generates unnormalized probabilities "$P_i$" of the symbols and a normalization factor "N" that converts the unnormalized probabilities to true probabilities. At the "nth" encoding step, "$L_n$" is denoted as the lower bound ("Low") of the coding interval, "$R_n$" is denoted as the current coding interval size ("Range"), and then the coding interval is represented by $A_n = [L_n, L_n + R_n)$ with $A_0$ in $[0, 1.0)$. At the next encoding step, when encoding the "ith" symbol, the arithmetic coding algorithm replaces the "$A_n$" coding interval, with the new "$A_{n+1}$" sub-interval such that $$A_{n+1} = \left[ L_n + \frac{R_n C_i}{N}, L_N + \frac{R_n C_{i-1}}{N} \right) \text{ where } C_i = \sum_{j>i} P_j$$

is the cumulative total of the unnormalized probabilities from symbol "i", with $C_m = 0$ and $C_0 = N$.

The arithmetic coding technique require s the use of infinite precision in representing the coding interval and the normalization factor N. To avoid the register overflow problem in hardware implementations, the upper bits of Range are transmitted as soon as their value is known. Furthermore, re-scaling is used such that whenever N reaches a preset threshold "T", the frequencies of all symbols are scaled down by a factor "f" (typically, "f"=0.5). In effect, re-scaling partitions the original size of the data file into blocks of size "M".

The strength of the arithmetic coding method resides in the separation of the modeler from the coder. Arithmetic coders can work with either fixed or adaptive models. In fixed (or static) models, the statistics of the data are determined before the coding process is implemented and are constant in value. In adaptive models, the statistics of the data are learned as the data is processed by the coder. Typically, an adaptive model will continuously increment the count of every processed symbol by a weight "w" associated with each symbol. Usually, "w" has a fixed value that is chosen to be equal to one.

The present invention includes a novel modeling method to be used in conjunction with a coder and a random number generator to compress the data in a secure fashion. Basically, the modeling method involves the use of a modeler that randomly updates at least one of its internal states. Those skilled in the art will understand that in order to update randomly an internal state, the value of at least one variable must be updated randomly. The random update of at least one internal state of the model is done based on the outcome of a random number generator such as a stream cipher. This technique results in modelers with variable internal structure. This variability enables the compression of the data in a secure fashion.

A preferred modeler that may be adapted to randomly update at least one of its internal states is a "learning"

semi-adaptive modeler. Since the modeler is semi-adaptive, it alternates between two stages: a static stage and an adaptive stage. The term "learning" is used to describe the semi-adaptive modeler because the modeler learns the data during the static stage without updating the internal states of the static stage. The modeler randomly updates its internal states in that the duration of the static stage, that is, the number of symbols processed in the static stage, is determined by the output of a random number generator. Thus, in the static stage, the modeler learns a random number of symbols (i.e. a random segment length), but does not update its internal states. In the adaptive stage, the modeler updates its internal states using the information from the static stage and the data that was learned during the static stage. The modeler may operate in the adaptive stage such that it processes a random number of symbols. At the end of the adaptive stage, the resulting model is the new static model that will be used in the next static stage, the duration of which will be determined by the random number generator. The process is repeated until the totality of the data is processed.

Figure 4:
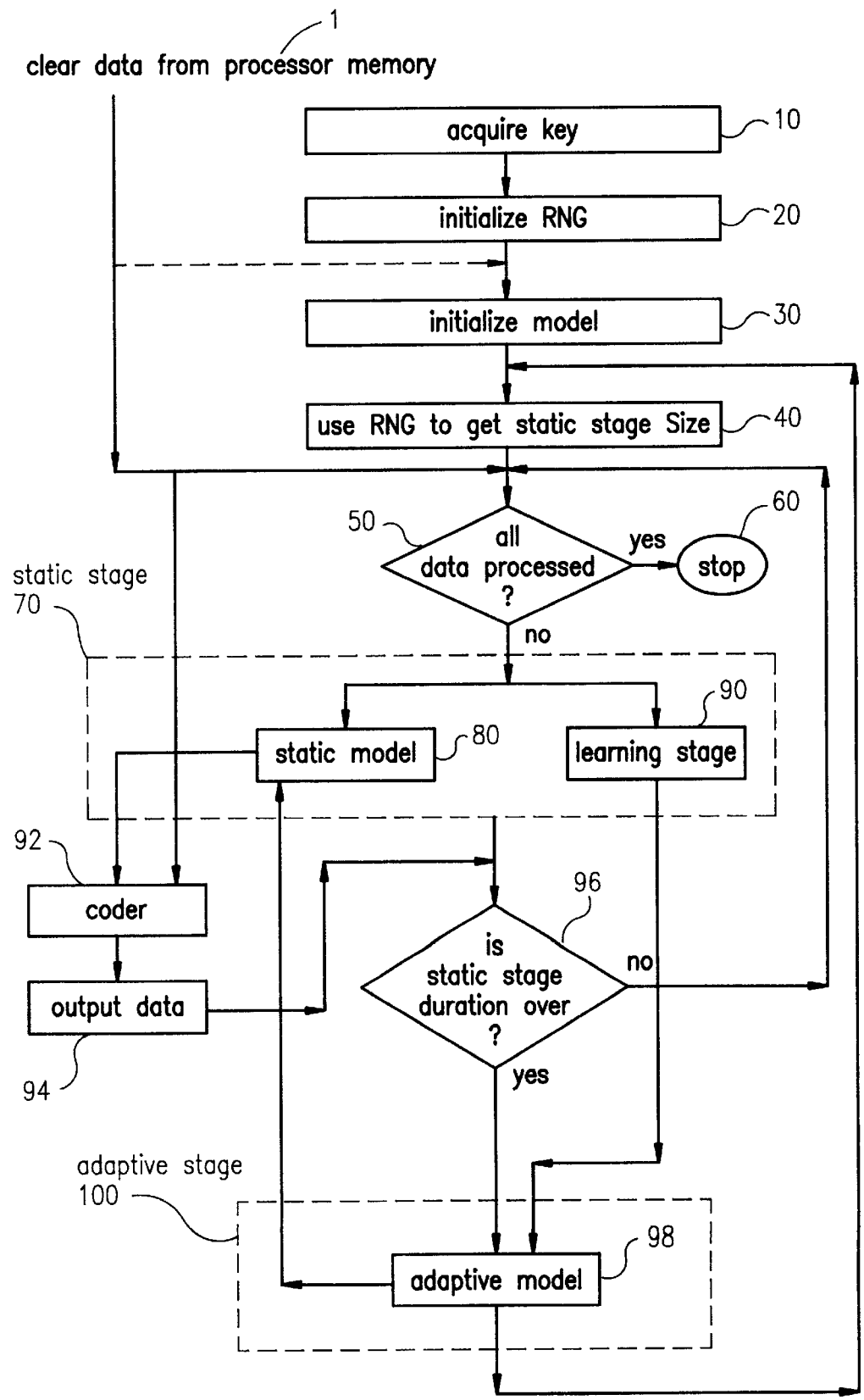
FIG. 4 is a block diagram of the learning semi-adaptive modeling method for the simultaneous compression and encryption method of the embodiment of FIG. 1.

Referring to FIG. 4, a more detailed description of the modeling method is provided. In step 10, an encryption key or seed is acquired. The key is used to initialize a random number generator "RNG" in step 20. The model is then initialized in step 30. The process of initializing the model can be based on the random data acquired from the RNG of step 20, the clear data of step 1, or both the RNG of step 20 and the clear data of step 1. In step 40, the RNG is used to generate the duration ("Size") of the static model operation. In step 50, a check is performed to determine if the data is fully processed. If this is the case, the process is terminated in step 60. Otherwise the data of step 1 is passed to a learning stage in step 90. In step 80 the static model supplies coding information to the coder of step 92 that encodes the data of step 1. The static stage 70 consists of the static model of step 80 and the learning stage of step 90. The processed data is sent to a medium in step 94. In step 96, a check is performed to determine if the static stage 70 is finished. If so, the adaptive stage 100 of the modeling method is invoked in step 98, wherein the data learned from step 90 is used with the data of the static model of step 80 to update the adaptive model of step 98. The adaptive model of step 98 will become the new static model of step 80. Processing then continues in step 40.

Alternatively, the duration of the adaptive stage of step 100 could be specified by the output of the stream cipher of step 40. The adaptive stage would behave like typical implementations of adaptive modelers where the modeler will learn the symbol, update its internal states, and present the results to the coder of step 92. The process would be repeated for the duration of the adaptive stage as specified by the output of the RNG of step 40, or until all the data is processed. At the end of the adaptive stage, the model would become the new static model. Processing would then continued at step 40.

The modeling method of FIG. 4 is a learning semi-adaptive modeler, and is an example of a modeler that has at least one randomly varying internal state or, in other words, a modeler that has at least one state that is updated at random intervals.

The modeling method of FIG. 4 can use a wide range of random number generators, including stream ciphers and block ciphers. The method can also be used with a wide range of coders, such as a Huffman coder, a Ziv-Lempel ("ZL") coder, a modified run length encoder ("RLE"), or an arithmetic coder. In general, coders requiring a learning model in compressing data can be used in conjunction with the modeling method of the invention.

The modeling method of the invention enables the development of real time systems that perform simultaneous compression and encryption. The modeling method induces randomness into the coding probabilities that are needed by the coder. The induced randomness can only be decoded by a system that can decipher them. Hence, the modeling method allows for the compression of data in a secure fashion.

Use of the modeling method of FIG. 4 in conjunction with an arithmetic coder is described below. A learning semi-adaptive modeler is developed that provides to an arithmetic coder probability estimates of the symbols that are a function of their occurrence in the clear text and a stream cipher. The modeler keeps track of the frequency of occurrence of each symbol as it appears in the data, but updates the cumulative frequency tables and the normalization factor at random intervals. This technique makes each symbol's coding probability a function both of its frequency of occurrence and of random bytes generated by a stream cipher.

By using the method of FIG. 4, the modeler takes advantage of the re-scaling property that is required in finite precision implementation of arithmetic coding, wherein the large size blocks (size "M") are further sub-divided into smaller variable size sub-blocks. The size of each sub-block is determined by the outcome of the stream cipher. Within each sub-block, the modeler will keep track of the frequency of occurrence of each symbol. However, the update of the cumulative frequency table and the normalization factor is performed at the end of the sub-block. During the encoding or decoding process within a sub-block, the model will generate probability estimates of the symbols that are fixed and are used for the duration of the sub-block.

For a given encryption key and the resulting stream cipher output, the simultaneous data compression and encryption method of the invention will generate a stream of compressed and encrypted bits that are unique for that encryption key. The internal states of the modeler are determined at any given time by the initial distribution of frequencies in the modeler, the number of processed symbols, and the current size of the static sub-block as specified by the stream cipher.

An embodiment of a randomly updated learning semi-adaptive model used in conjunction with an arithmetic coder will now be discussed. A multi-symbol alphabet of size "m" (typically 256 symbols) is assumed. It is also assumed that 16 bits are allocated to represent "N", and that 32 bits are used to represent the coding interval. It is also assumed that there exists a frequency array means and a cumulative frequency array means that hold the frequencies and cumulative frequencies of the symbols respectively.

Figure 5:
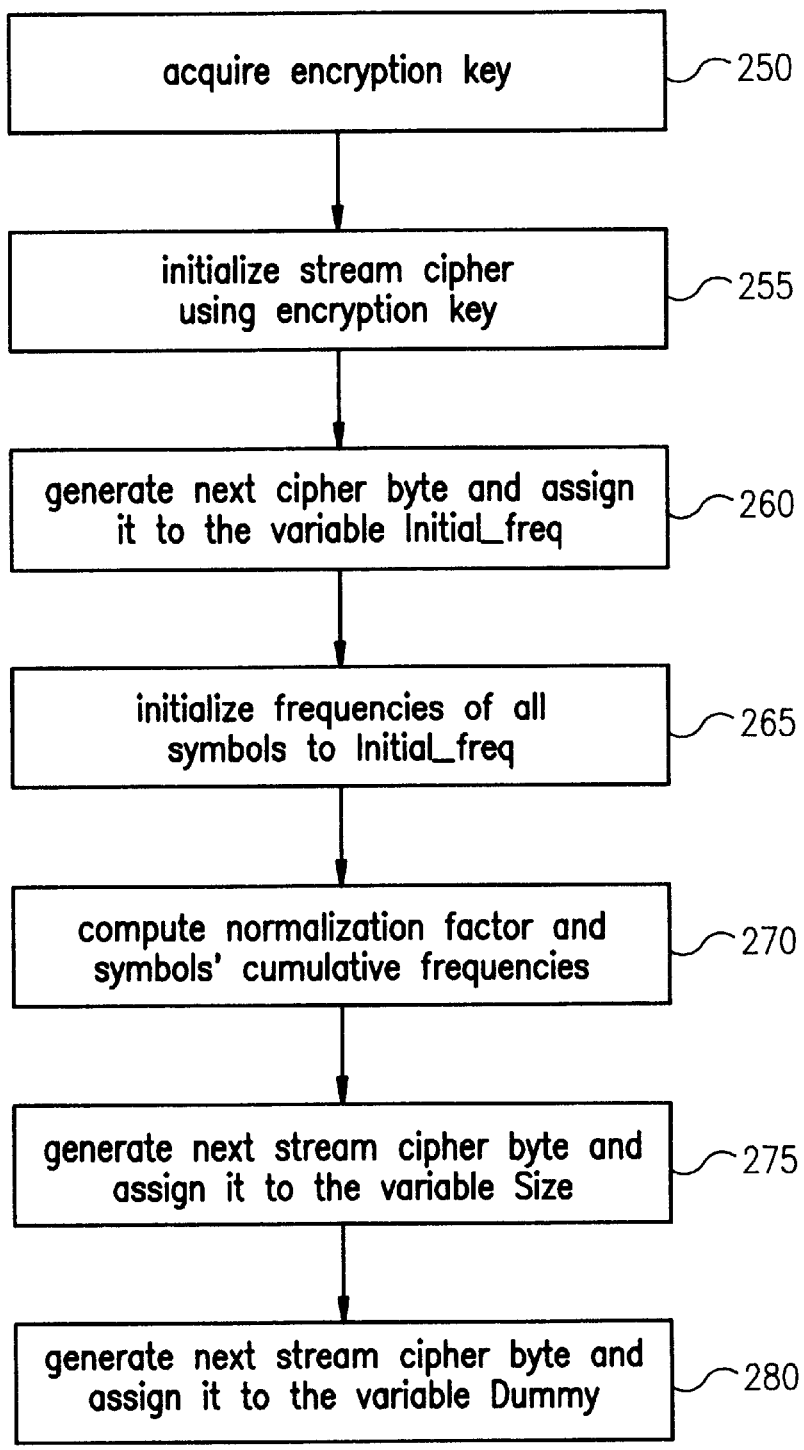
FIG. 5 is a block diagram of the initialization steps for the simultaneous compression and encryption method of the embodiment of FIG. 1.

FIG. 5 illustrates the initialization steps needed for the encoding stage. The same steps are also performed in the initialization of the decoding stage. In step 250, an encryption key is obtained to be used with the stream cipher. In step 255, the stream cipher is initialized using the encryption key that was acquired in step 250. In step 260, the first byte (8 bits) of the stream cipher is generated and assigned to the variable "Initial_freq". In step 265, the initial value of the frequencies of all the symbols in the alphabet are initialized to "Initial_freq". In step 270, the normalization factor and the symbols' cumulative frequencies are computed. In step 275, the next byte of the stream cipher is generated and assigned to the variable "Size". The variable Size holds the initial sub-block size. In step 280, the next byte of the stream cipher is generated and assigned to the variable "Dummy". The Dummy variable is encoded after each symbol in the sub-block. This technique adds more randomness to the data.

Figure 6:
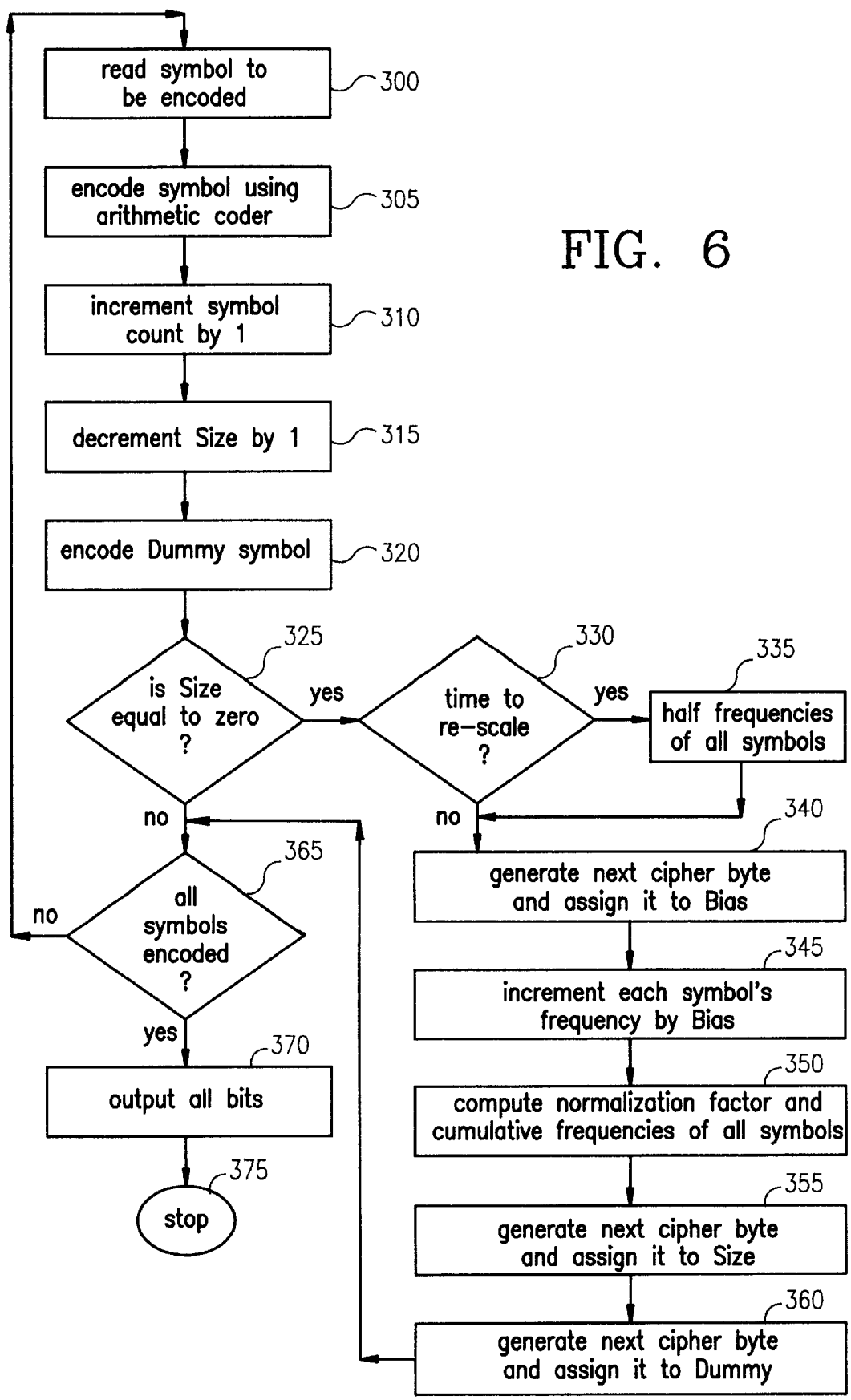
FIG. 6 is a block diagram of the steps of the simultaneous compression and encryption method of the embodiment of FIG. 1.

FIG. 6 illustrates the encoding of symbols. After initializing the encoder by performing the steps specified in FIG. 5, the encoding process starts in step 300, where the symbol to be encoded is read. In step 305, the symbol is encoded using an arithmetic coder, using the coding probabilities supplied by the modeler as described above. In step 310, the frequency count of the symbol is incremented by 1. In step 315, the value of Size is decremented by 1 to indicate that the symbol has been encoded. In step 320, the variable Dummy is encoded. The encoding of Dummy adds further randomness to the output bit stream. Step 325 checks if it is time to update the symbols' cumulative frequencies. If not, then the procedure checks if all the symbols are encoded in step 365. If not, the procedure reads the next symbol to be processed in step 300, and the above process is repeated. If all symbols are encoded, then the procedure outputs all bits in step 370 and terminates in step 375. If the result of the check in step 325 indicates that the block size is zero, the procedure performs another check in step 330 to determine if re-scaling is required. If re-scaling is required, then in step 335 the frequencies of all symbols are halved in value, while making sure that all affected values are greater than zero. In step 340, the stream cipher is used to generate a byte that is assigned to the variable "Bias". In step 345, the value of Bias is added to the frequency of each symbol. The procedure re-computes the symbols' cumulative frequencies and computes the normalization factor in step 350. In step 335, the procedure generates the next stream cipher byte and assigns it to the variable Size. This is the size of the next sub-block to be processed. In step 360, the procedure generates a cipher byte and assigns it to the variable Dummy. The procedure continues the processing in step 365.

Figure 7:
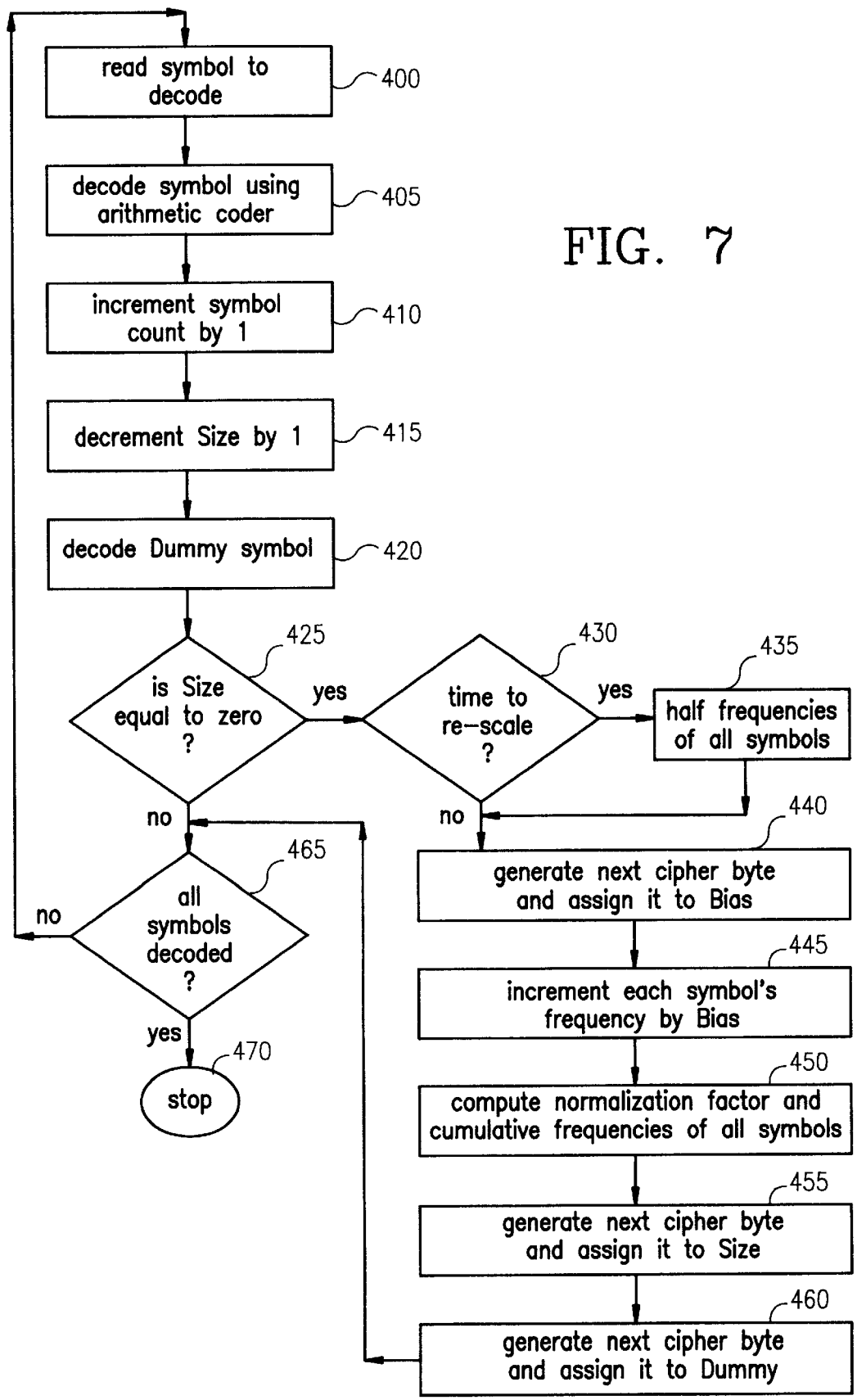
FIG. 7 is a block diagram of the steps of the simultaneous decompression and decryption method of the embodiment of FIG. 1.

FIG. 7 illustrates the decoding of the symbols. After initializing the decoder by performing the steps specified in FIG. 5, the decoding process starts in step 400, where the symbol to be decoded is read. In step 405, the symbol is decoded using an arithmetic coder, using the coding probabilities supplied by the modeler as described above. In step 410, the frequency count of the decoded symbol is incremented by 1. In step 415, the value of Size is decremented by 1 to indicate that the symbol has been decoded. In step 420, the Dummy symbol is decoded. Step 425 checks if it is time to update the symbols' cumulative frequencies. If not, then the procedure checks if all the symbols are decoded in step 465. If not, the procedure reads the next symbol to be decoded in step 400, and the above process is repeated. If all symbols are decoded, then the procedure terminates in step 470. If the result of the check in step 425 indicates that the block size is zero, the procedure performs another check in step 430 to determine if re-scaling is required. If re-scaling is required, then the procedure halves the frequencies of all symbols in step 435. The process must ensure that the frequency of all symbols is greater than zero. In step 440, a cipher byte is generated and assigned to the variable "Bias". In step 445, the value of Bias is added to the frequencies of each symbol. In step 450, the procedure re-computes the symbols' cumulative frequencies and computes the normalization factor. In step 455, a cipher byte is generated and assigned to the variable Size. This is the size of the next sub-block to be processed. The procedure then employs the stream cipher to generate the next byte and assigns it to the variable Dummy in step 460. Processing then continues in step 465.

Figure 8:
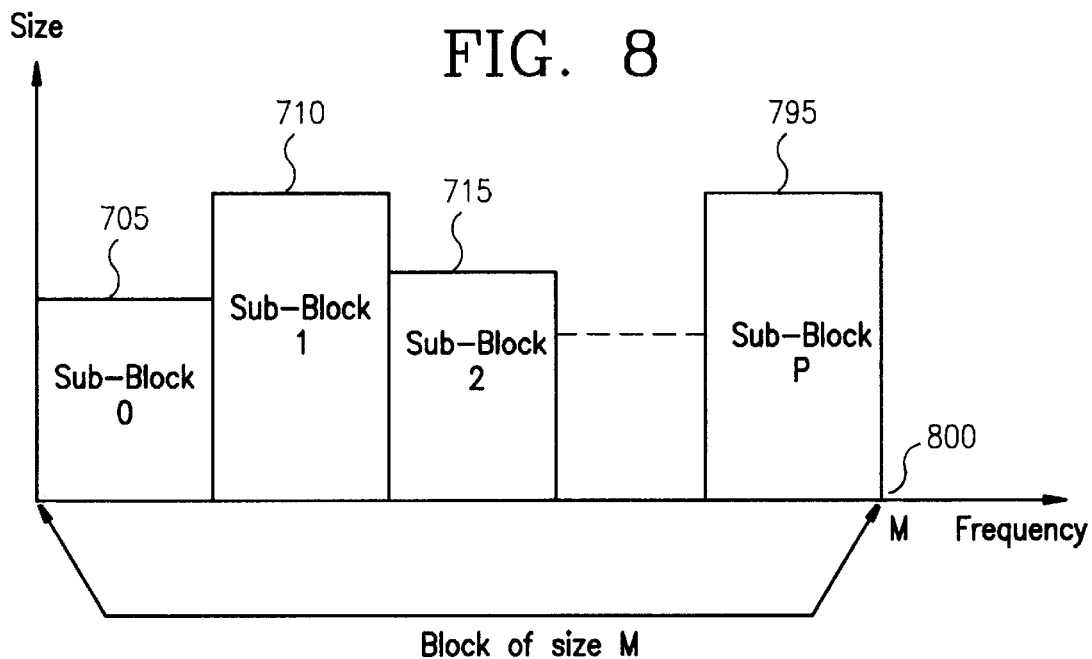
FIG. 8 is a block diagram of the modeler steps for an arithmetic coder for the simultaneous compression and encryption method of the embodiment of FIG. 1.

In FIG. 8, the randomness introduced by the modeler to the symbols' coding probabilities is illustrated. FIG. 8 depicts the effects of re-scaling on the processed text data. As stated above, re-scaling has the effect of partitioning the input data into blocks of size "M" as shown in step 800. The preferred modeler uses a stream cipher to divide the block into sub-blocks of variable size. The size of each sub-block is equal to the value of the byte generated by the stream cipher. The sub-blocks are depicted in FIG. 8 in steps 705, 710, 715 and 795. In step 705, the modeler is initialized. The initial value of the frequencies of the symbols is determined by the outcome of the stream cipher. At the beginning of the sub-block of step 705, the modeler will compute the symbols' cumulative frequencies and the normalization factor. For the duration of the sub-block of step 705, the modeler will generate the symbols' coding probabilities to be used by the arithmetic coder using the symbols' cumulative frequencies and the normalization factor that were computed at the beginning of the sub-block. However, for the duration of the sub-block of step 705, the modeler will keep count of the occurrence of every symbol that appears in the input data. At the end of the sub-block of step 705, the modeler invokes the stream cipher to generate a byte that is assigned to the variable Bias. The modeler increments the frequency of each symbol by the value of Bias. This is equivalent to having a variable as opposed to a fixed value of the weight "w", and leads to a variable value for re-scaling time. The modeler then re-computes the symbols' cumulative frequencies and the normalization factor. These values are then used to generate the symbols' coding probabilities to be used in the sub-block of step 710. The procedure is repeated until the end of the input data is reached.

The computational complexity of the illustrated simultaneous compression and encryption technique is less than the computational complexity of known sequential compression and encryption techniques, and is also less than the computational complexity of known compression techniques based on an adaptive modeler used in conjunction with coder such as an arithmetic coder. Furthermore, it has been found that the compression ratios achieved by embodiments of the invention are comparable to that achieved by compressing data using a known adaptive modeler in conjunction with a coder.

The security benefits of the modeling method reside in the modeling method's ability to generate coding probabilities that are updated randomly. The update time, i.e. the number of processed symbols, is a function of the stream cipher. Additionally, the illustrated modeler incorporates other features that enhance the overall security of the system. One such feature is the use of the stream cipher to add Bias to the frequency of each symbol at the end of each sub-block. This feature is important since in effect it results in a variable value for re-scaling time. Another security feature of the illustrated modeler is the encoding of the variable Dummy in each sub-block. The value of Dummy is a function of the stream cipher. The encoding of Dummy has the effect of adding random bits to the encoded bit stream, thus increasing the security of the system. In a practical system implementation, the encoding or decoding of the Dummy symbol is done by either decreasing the size of Range by Dummy or increasing the value of Low by Dummy. For optimal compression efficiency, it is preferred that the value of Dummy be small. Hence, only selected bits of Dummy can be used during the encoding or decoding procedure.

The illustrated method prevents an unauthorized attacker from determining the internal states of the modeler, and in particular, the re-scaling time and the coding probabilities of the symbols. The modeler does not impose any restrictions on the type of stream cipher. Basically, any bit oriented, byte oriented, word oriented or long word oriented stream cipher may be used. In addition, virtually any block cipher or random number generator may be used.

While the invention has been particularly shown and described above with reference to a specific embodiment, the foregoing and other changes in form and detail may be made therein by one skilled in the art without departing from the spirit and scope of the invention. For example, when the invention is implemented in a real time system, the sender and the receiver can exchange a token that specifies the starting byte of the stream cipher that should be used for a particular session. In this fashion, the stream cipher will generate different streams every time the system is started or reset. This technique is effective against cryptographic attacks that require multi-system reset. Similarly, a new encryption key could be used after every session or after every reset. Any secure key management policy can be used to ensure proper key exchange.

Another variation includes the possibility of employing several stream ciphers to generate the variables in the system. For example, one stream cipher can be used to generate the value of Bias, another can be used to generate the value of Dummy, and yet another can be used to generate the value of Size. Another variation includes the possibility of using more than one value for Dummy within a sub-block. Furthermore, more than one stream cipher could be used to generate the sizes of the sub-blocks. Similarly, more than one stream cipher could be used to generate the Initial_freq value that is used in the initialization of the modeler. Another variation includes the possibility of encrypting one or both of the Range or the Low variables with the stream cipher after processing every symbol in a sub-block. Another variation includes encrypting each symbol's cumulative frequency with the stream cipher prior to computing the symbol's true probability in a sub-block. Another variation includes the possibility of decrementing the value of Size by a random value as determined by the stream cipher. Another variation includes the possibility of subdividing each sub-block as a function of the stream cipher.

Another variation includes the possibility of mapping the frequencies of the symbols in each sub-block such that the sum of the frequencies is an integral power of 2 (see U.S. patent application Ser. No. 08/609,129). In this variation, the process of computing the normalization factor may be omitted. The method enables faster implementation of arithmetic coding, whereby the divide instruction that is needed in computing the symbols' coding probability is replaced by a shift instruction. However, this technique will result in systems that are less secure, since an attacker need not determine the normalization factor.

The simultaneous data compression and encryption method of the present invention provides a method for compressing data in a secure fashion. To obtain even greater security, the invention may be used as a building block in cascaded or multi-step data compression and encryption systems. In this regard, a coder, such as a ZL coder (see, J. Ziv and A. Lempel, "A Universal Algorithm for Sequential Data Compression," IEEE Transactions on Information Theory, Vol. IT-23, No. 3, May 1977, pp. 337–343), may be employed as a front end data compressor in a cascaded or multi-step data compression and encryption system. Those skilled in the art will know that the ZL method assigns fixed-length codes to variable size strings. The ZL method maintains a history buffer of the last N (typically 4096) characters from the input data stream and encodes the output data stream as a sequence of symbols. If the character string is not found, it is encoded as zero followed by the original eight bit character, resulting in a nine bit code. If a character or stream of characters is found in the dictionary (i.e. history buffer), the stream is encoded as one followed by an index and length in the dictionary. The encoding procedure enables the receiving end to reconstruct from its copy of the buffer, the transmitted data, without the overhead of transmitting table information. In a typical implementation of the ZL method, the size of the index is in the range of 11–14 bits, with 12 bits as the most common due to the ease of its implementation. Hashing functions are generally used for the efficient matching of strings.

In a cascaded or multi-step data compression and encryption system, the output of the ZL coder can be further compressed in a secure fashion by using the present invention. For added security, the output of the ZL coder can be split into two streams, whereby each stream is modeled by a separate instance of the preferred modeler. In particular, a "Literal Model" can be used to model those bits representing the lengths of the symbols and the strings respectively. An "Offset Model" can be used to model the string offsets.

Figure 9:
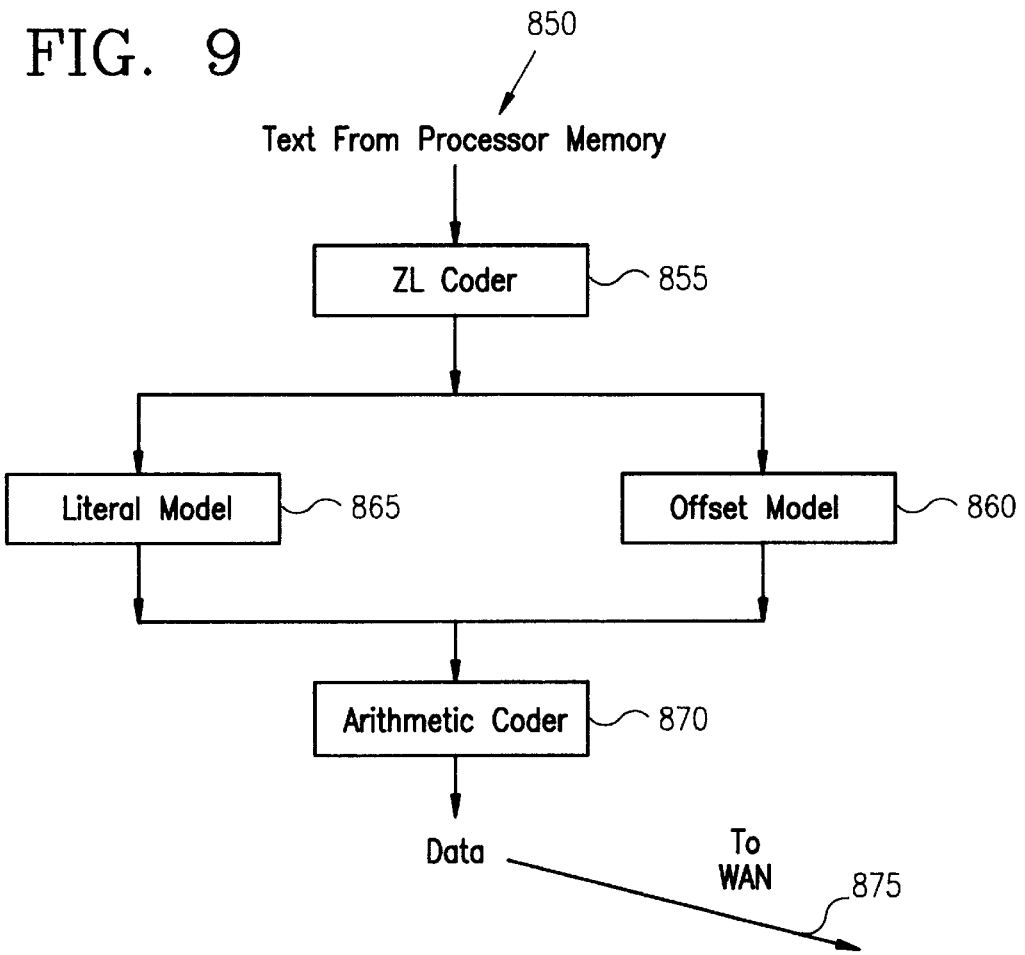
FIG. 9 is a block diagram of the steps of a cascaded or multi-step simultaneous compression and encryption method.

The details of the implementation are illustrated further in FIG. 9. In step 850, the clear data is fed to the ZL coder from the processor memory. In step 855, ZL coding is performed. In step 860, the Offset Model is used to generate the coding probabilities of the string indices. In step 865, the Literal Model is used to generate the decoding probabilities for the alphabet symbols and string lengths. In step 870, the data is processed by an arithmetic coder. Steps 860, 865 and 870 constitute simultaneous compression and encryption of the data. In step 875, the compressed data is transmitted over a WAN. The inverse procedure can be used to decode the data at the receiving end.

Those skilled in the art will recognize that even greater security may be achieved by using the modeler of the present invention in a cascaded or multi-step system. The security is greater because in a multi-step system an attacker must deal with a compression and encryption system that has more unknowns. Basically, the attacker has to infer the internal states of the ZL coder, the internal states of the offset model and its stream cipher or ciphers, and the internal states of the literal model and its stream cipher or stream ciphers.

Numerous modifications, variations and adaptations may be made to the particular embodiments of the invention described above without departing from the scope of the invention, which is defined in the claims.

I claim:

1. A method for utilizing a processor to change the form of input data having symbols, comprising the steps of:

a) providing the input data to the processor;

b) processing the input data in the processor by compressing and encrypting the input data in one step to generate compressed and encrypted data; and c) applying the compressed and encrypted data to a medium.

2. A method as defined in claim 1, wherein step (b) comprises the step of:

b) processing the input data in the processor by compressing and introducing randomness into the input data in one step to generate compressed and encrypted data.

3. A method as defined in claim 2, comprising the steps of:

a) providing the input data to the processor;

b) processing the input data in the processor by implementing a learning modeling method having at least one state that is randomly updated;

c) processing the input data in the processor by implementing a back end coder to generate compressed and encrypted data by coding the symbols; and d) applying the compressed and encrypted data to a medium.

4. A method as defined in claim 3, wherein step (b) comprises the step of:

b) processing the input data in the processor by implementing a learning modeling method having at least one state that is updated after a random number of symbols are learned.

5. A method as defined in claim 4, wherein the modeling method is a learning semi-adaptive modeling method having a static stage and an adaptive stage.

6. A method as defined in claim 5, wherein the at least one state is updated after a random number of symbols are processed in the static stage.

7. A method as defined in claim 4, wherein steps (b) and (c) comprise the steps of:

b) processing the input data in the processor by implementing a learning modeling method comprising partitioning the input data into blocks having a random number of symbols, and generating probabilistic estimates from at least one block;

c) processing the input data in the processor by implementing a back end coder to generate compressed and encrypted data by coding the symbols using the probabilistic estimates.

8. A method as defined in claim 7, wherein step (b) comprises the step of:

b) processing the input data in the processor by implementing a learning modeling method comprising partitioning the input data into blocks having a random number of symbols, each symbol having a frequency, and generating probabilistic estimates of the frequencies of the symbols from at least one block.

9. A method as defined in claim 8, wherein step (b) comprises the step of:

b) processing the input data in the processor by implementing a learning modeling method comprising partitioning the input data into blocks having a random number of symbols, each symbol having a frequency, biasing the frequency of at least one symbol in at least one block by a random number, and generating probabilistic estimates of the frequencies of the symbols from at least one block.

10. A method as defined in claim 7, wherein step (b) comprises the step of:

b) processing the input data in the processor by implementing a learning modeling method comprising partitioning the input data into at least one segment having a random number of symbols, partitioning each segment into blocks having a random number of symbols, and generating probabilistic estimates from at least one block.

11. A method as defined in claim 7, wherein the learning modeling method comprises generating probabilistic estimates from each block.

12. A method as defined in claim 7, wherein the number of symbols learned before the at least one state is updated is determined by a random number generator initialized with a seed.

13. A method as defined in claim 12, wherein the random number generator is a stream cipher and the seed is a key.

14. A method as defined in claim 1, further comprising between steps (a) and (b) the step of:

processing the input data in the processor by implementing at least one front end coder.

15. A method as defined in claim 7, the modeling method further comprising generating at least one random symbol in at least one block.

16. A method as defined in claim 3, wherein the back end coder is an arithmetic coder.

17. An apparatus for utilizing a processor to change the form of input data having symbols, comprising:

a) means for obtaining the input data at the processor;

b) means at the processor for processing the input data, comprising means for compressing and encrypting the input data in one step to generate compressed and encrypted data; and c) means for applying the compressed and encrypted data to a medium.

18. An apparatus as defined in claim 17, wherein the means for processing the input data comprises means for compressing and introducing randomness into the input data in one step to generate compressed and encrypted data.

19. An apparatus as defined in claim 18, comprising:

a) means for obtaining the input data at the processor;

b) modeler means at the processor for processing the input data, comprising means for implementing a learning modeling method having at least one state that is randomly updated;

c) coder means at the processor for processing the input data, comprising means for implementing a back end coder to generate compressed and encrypted data by coding the symbols; and d) means for applying the compressed and encrypted data to a medium.

20. An apparatus as defined in claim 19, wherein the modeler means comprises means for implementing a learning modeling method having at least one state that is updated after a random number of symbols are learned.

21. An apparatus as defined in claim 20, wherein the modeling method is a learning semi-adaptive modeling method having a static stage and an adaptive stage.

22. An apparatus as defined in claim 21, wherein the at least one state is updated after a random number of symbols are processed in the static stage.

23. An apparatus as defined in claim 20, wherein the modeler means comprises means for implementing a learning modeling method comprising means for partitioning the input data into blocks having a random number of symbols, and means for generating probabilistic estimates from at least one block; and wherein the coder means comprises means for implementing a back end coder to generate compressed and encrypted data by coding the symbols using the probabilistic estimates.

24. An apparatus as defined in claim 23, wherein the modeler means comprises means for implementing a learning modeling method comprising means for partitioning the input data into blocks having a random number of symbols, each symbol having a frequency, and means for generating probabilistic estimates of the frequencies of the symbols from at least one block.

25. An apparatus as defined in claim 24, wherein the modeler means comprises means for implementing a learning modeling method comprising means for partitioning the input data into blocks having a random number of symbols, each symbol having a frequency, means for biasing the frequency of at least one symbol in at least one block by a random number, and means for generating probabilistic estimates of the frequencies of the symbols from at least one block.

26. An apparatus as defined in claim 23, wherein the modeler means comprises means for implementing a learning modeling method comprising means for partitioning the input data into at least one segment having a random number of symbols, means for partitioning each segment into blocks having a random number of symbols, and means for generating probabilistic estimates from at least one block.

27. An apparatus as defined in claim 23, wherein the means for implementing the learning modeling method comprises means for generating probabilistic estimates from each block.

28. An apparatus as defined in claim 23, wherein the number of symbols learned before the at least one state is updated is determined by a random number generator initialized with a seed.

29. An apparatus as defined in claim 28, wherein the random number generator is a stream cipher and the seed is a key.

30. An apparatus as defined in claim 17, further comprising means at the processor for processing the input data comprising at least one front end coder.

31. An apparatus as defined in claim 23, the modeler means further comprising means for generating at least one random symbol in at least one block.

32. An apparatus as defined in claim 19, wherein the back end coder is an arithmetic coder.

* * * * *

UNITED STATES PATENT AND TRADEMARK OFFICE
CERTIFICATE OF CORRECTION

PATENT NO. : 6,122,379
DATED : September 19, 2000
INVENTOR(S) : BARBIR

It is certified that error appears in the above-identified patent and that said Letters Patent is hereby corrected as shown below:

Inventor's first name should be "Ab<u>d</u>ulkader" and not "Ab<u>b</u>ulkader"

Signed and Sealed this

First Day of May, 2001

*Attest:*

NICHOLAS P. GODICI

*Attesting Officer*     Acting Director of the United States Patent and Trademark Office